United States Patent [19]

Fredriksson

[11] Patent Number: 4,804,439
[45] Date of Patent: Feb. 14, 1989

[54] MEANS AND METHOD FOR REMOVAL OF STRINGS FROM WASTE PAPER

[75] Inventor: Borje Fredriksson, Sundsvall, Sweden

[73] Assignee: Beloit Corporation, Beloit, Wis.

[21] Appl. No.: 155,176

[22] Filed: Feb. 11, 1988

[51] Int. Cl.$^4$ .............................................. D21B 1/32
[52] U.S. Cl. ......................................... 162/55; 162/4; 209/279; 209/280; 209/362; 210/359; 210/415; 241/79; 366/296; 366/301; 366/320
[58] Field of Search .................. 162/4, 55, 261; 210/359, 413, 415, 497.1; 209/273, 274, 279, 280, 283, 305, 362, 3, 17; 241/79; 366/296, 301, 320

[56] References Cited

U.S. PATENT DOCUMENTS

| | | | |
|---|---|---|---|
| 1,734,632 | 11/1929 | Merrill | 366/320 |
| 3,315,947 | 4/1967 | Nauta | 366/320 |
| 3,615,014 | 10/1971 | Hruby | 162/4 |
| 4,017,033 | 4/1977 | Tra | 162/4 |
| 4,535,943 | 8/1985 | Couture | 162/261 |
| 4,725,007 | 2/1988 | Chupka | 162/261 |

FOREIGN PATENT DOCUMENTS 2751091  5/1978  Fed. Rep. of Germany ...... 210/415

Primary Examiner—Keneth M. Schor
Assistant Examiner—K. M. Hastings
Attorney, Agent, or Firm—Dirk J. Veneman; Raymond W. Campbell

[57] ABSTRACT

A method and apparatus for removing stringy contaminants from a pulp in a wastepaper recovery system having a pulping vat with an elongate helically shaped rod in the vat with means for causing a relative rotation between the stock and the helical rod so that long slender contaminants will be captured and climb the rod. In one form, multiple helices are employed and the rods may be driven in rotation, or the stock caused to rotate about the helix by other means.

19 Claims, 3 Drawing Sheets

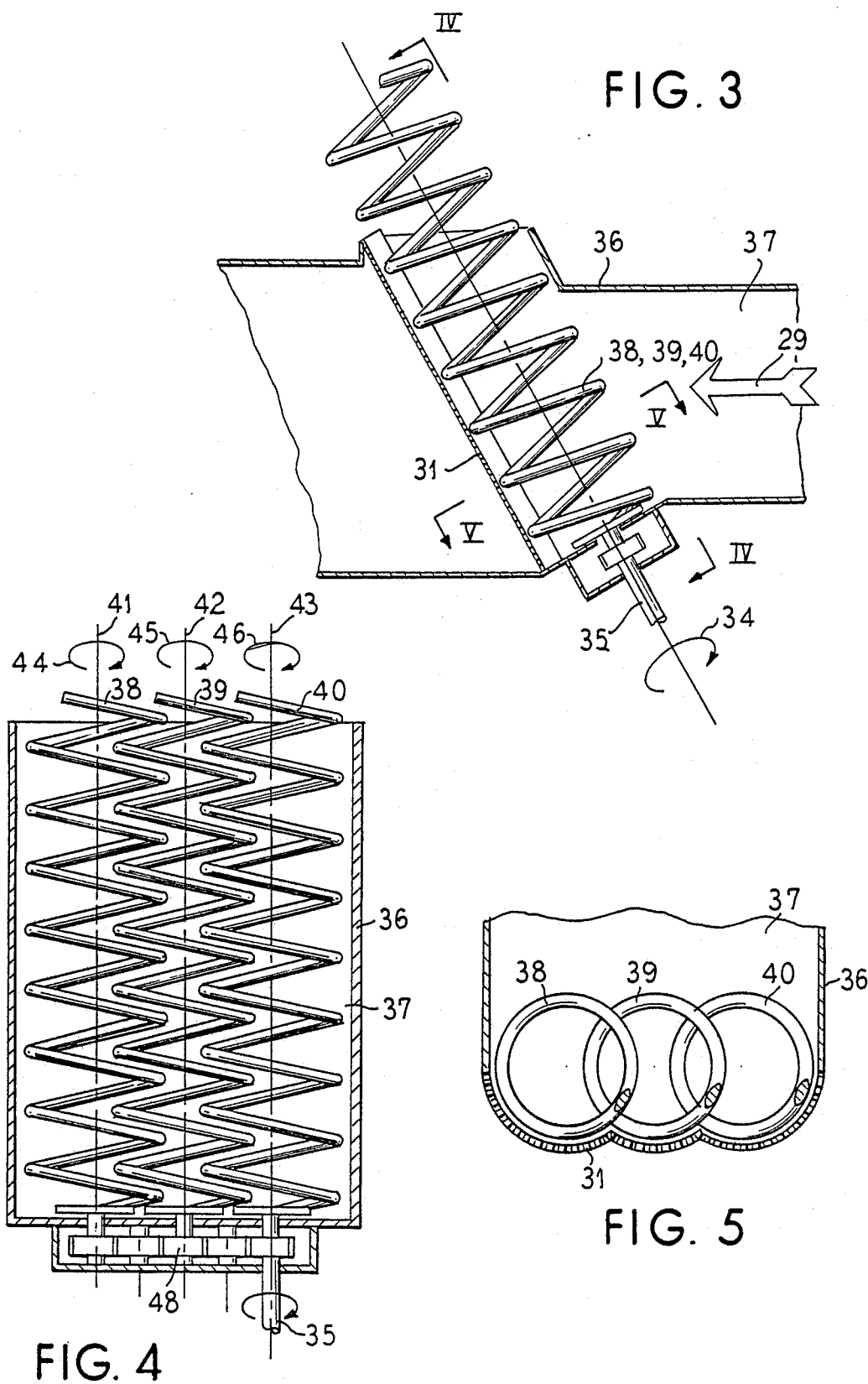

MEANS AND METHOD FOR REMOVAL OF STRINGS FROM WASTE PAPER

BACKGROUND OF THE INVENTION

The present invention relates to improvements in methods and apparatus for recovering and pulping wastepaper, and more particularly for removing the elongate contaminants including strings, wires, bands and so forth from stock.

In arrangements heretofore available in conventional wastepaper recovery systems, elongate contaminants which cannot be allowed to remain in the pulp are removed from the pulp in a relatively high consistency stock. Such materials as strings, wires, bands and so forth which occur in bundled waste are removed at 3% to 5% consistency from the pulper by a device termed a "ragger". The long slender contaminants are twisted into a rope and continuously pulled out of the pulper. This arrangement, however, only works at a relatively low consistency, such as below approximately 6%.

For various reasons, it is advantageous to do repulping of waste at higher consistencies, such as in the 10% to 16% range which effects chemical and energy savings. Decontamination of the stock and removal of the slender contaminants has not been possible at these higher consistencies, and this has prevented high consistency pulpers from being operated continuously and particularly because of the difficulty or impossibility of the removal of long stringy contaminants from the thin stock.

It is accordingly an object of the present invention to provide an improved method and apparatus for the removal of long slender contaminants, such as wires, bands and strings, from waste stock and particularly which will operate successfully at high consistencies, that is, where the water to pulp ratio is relatively high.

A further object of the invention is to provide a simplified and improved method and apparatus for removal of long slender contaminants from wastepaper stock in a repulping operation which is capable of being operated over a range of consistencies.

FEATURES OF THE INVENTION

According to the principles of the invention, a helically shaped rod is positioned within the pulping vat. This rod is essentially in the shape of a helical coil spring and is arranged so that the pulp will rotate relative to the spring either by driving the spring itself in rotation about the axis of the helix or by providing a moving crib or other member in the vat which drives the stock in rotation. A spring or plurality of springs are arranged in different relative formations, such as either being inclined relative to a vertical plane or positioned vertically. Also, a plurality of spring coils may be arranged such as with one coil coaxial within another or with the coils interengaged with their axes spaced a smaller distance than their diameter. In different arrangements, the springs may be driven in the same direction or driven in opposing directions so as to cause the elongate contaminants to be engaged by the coil and to climb the helix formation of the coil to be continually removed from the vat.

Other objects and advantages will become more apparent with the teaching of the principles of the invention in connection with the disclosure of the preferred embodiments thereof in the specification, claims and drawings, in which:

DESCRIPTION OF THE DRAWINGS

FIG. 3 is a vertical fragmentary sectional view illustrating still another form of the invention;

FIG. 4 is a sectional view taken substantially along line IV—IV of FIG. 3;

FIG. 5 is a horizontal sectional view taken substantially along line V—V of FIG. 3;

DESCRIPTION OF THE PREFERRED EMBODIMENTS

Figure 1:
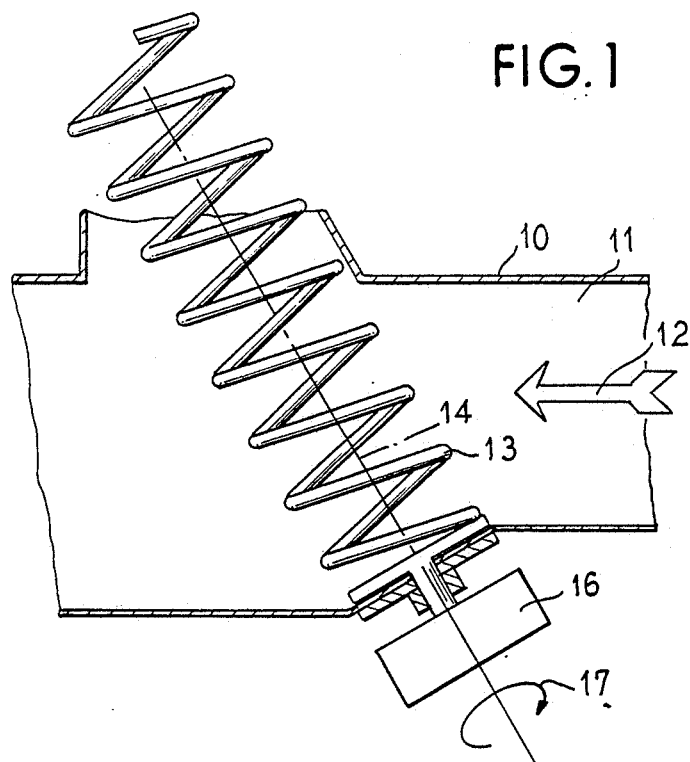
FIG. 1 is a fragmentary vertical sectional view of a wastepaper pulping vat employing a contaminant removal apparatus and method in accordance with the principles of the present invention.

FIG. 1 illustrates a wastepaper recovery vat 10 forming a chamber therein wherein wastepaper is mixed with water to form a stock. The chamber is arranged so that the flow of stock in the direction indicated by the arrowed line 12 flows past a helical shaped rod 13 shaped in the form of a helix about a central axis 14. The helix 13 which has the general appearance of a coil spring is set at an incline to the vertical and is driven in rotation as indicated by the arrowed line 17 by a suitable drive motor 16 at relative slow speeds.

The stock flowing past the helical rod 13 will carry the long slender contaminants past the helix or coil 13 so that the contaminants will be caught on the coils of the spring 13 and will tend to climb up the coils due to the interaction of the spring 13 rotating within the liquid stock so that the contaminants can be removed at location 15 at the top of the spring. While the spring may be positioned vertically, the angled inclined position of the spring tends to more effectively cause the stringy contaminants to climb up the smooth surface of the spring toward the top location 15. The rod which is formed in the shape of a coil to form the spring 13 is preferably a smooth surfaced material such as stainless steel so that the contaminants will readily slide upwardly. The stock is forced to flow in the direction indicated by the arrowed line such as by mixing the waste and water upstream, to the right in FIG. 1, and removal of the stock to the left in FIG. 1 by equipment, not shown.

Figure 2:
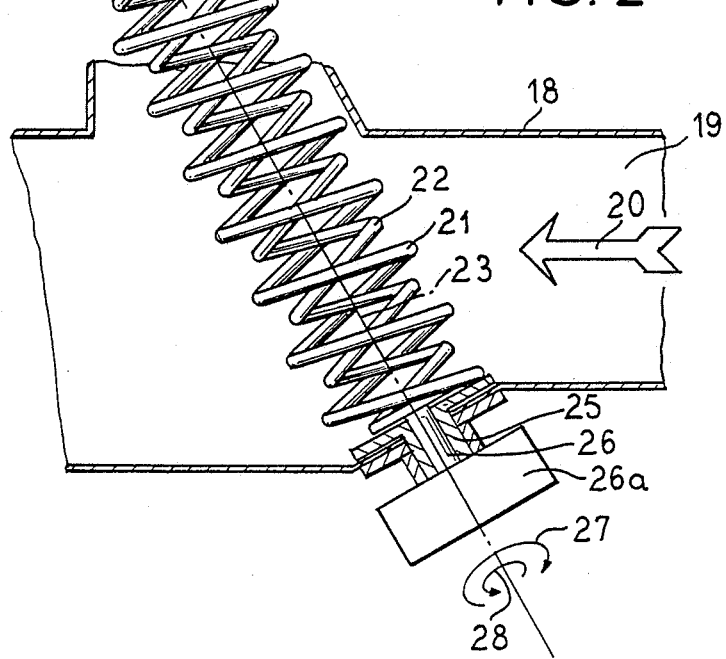
FIG. 2 is a fragmentary vertical sectional view illustrating another form of the invention.

In another form, plural coils may be used and as illustrated in FIG. 2, coils 21 and 22 of different size are used with the coil 22 being nested inside of the larger coil 21. Both coils are shaped to rotate about the same axis 23, and as in the arrangement of FIG. 1, the coils have sufficient stiffness to be supported at their lower end and to essentially be cantilevered at an inclined position. The coils are positioned within a vat 18 which provides a container 19 for stock which flows in the direction indicated by the arrowed line 20 to be forced through the coils. The chamber 19 preferably is arranged to be sufficiently narrow at the location of the coils so that all stock will flow close to or through the coils.

In certain instances it may be desirable to position sets of coils such as shown in either FIGS. 1 or 2 in successive banks so that any long slender contaminants not caught by the first bank of coils will be caught by successive banks. In the arrangement of FIG. 2, both coils are rotated in opposite directions as shown by the arrowed lines 27 and 28 with the coils respectively being driven by coaxial shafts 25 and 26 operated by a suitable motor 26a. The coaction between the coils aids in causing the contaminants to climb or to slide up the coils. By rotating in opposite direction and positioning one smaller coil inside of the other, the carrying ability of the coils is maximized.

In the arrangement of FIGS. 3 through 5, three coils 38, 39 and 40 are positioned adjacent each other and parallel to each other. In this arrangement, the direction of rotation for all three coils is the same being driven by a suitable drive means connected to a drive shaft 35 which, through gearing 48, drives the coils at the same speed and in the same rotational direction as indicated by the arrowed lines 41, 42 and 43. The coils are spaced apart and extend parallel to each other with the spacing being less than the diameter of the coils so that they are interleaved with each other. In the low consistency arrangement shown, a screen 31 is positioned downstream from the coils shaped with arcuate sectors to essentially conform to the curvature of the coils and being relatively close thereto to aid in holding the elongate slender stringy contaminants to the coil and forcing such contaminants to climb up the rods of the coil. At higher consistencies, the same arrangement of coils can be used, but without the screen 31. The coils again are inclined upwardly in the direction of flow of the liquid stock. In another arrangement contemplated, the series of coils may be arranged so that the flow is in the direction of sequential coils, as shown in FIG. 4. Also, in the arrangement shown in FIGS. 3 through 5, two coils may be used or more than three.

A feature of the invention is that the liquid stock is relatively forced past the coils and essentially the reaction of the liquid against the surface of the rods of the coil will carry the stringy contaminants up along the smooth surface of the rods. Utilizing this principle, different arrangements may be employed to force the flow of liquid stock along the coil rods. In the arrangements of FIGS. 1 through 5 with the stock flowing laterally and the coils inclined, the vector or component of reaction between the liquid and the rotating coils causes an upward circulation of the liquid carrying the stringy contaminants up along the rods of the coil to slide upwardly. The liquid engages the rods at an angle so that the angle between the rod surface and the flow direction forms an acute angle in a downward direction and an obtuse angle in an upward direction. Both the factors of movement of the coil and relative direction of flow contribute to the automatic climb or self-removal of the contaminants.

Figure 6:
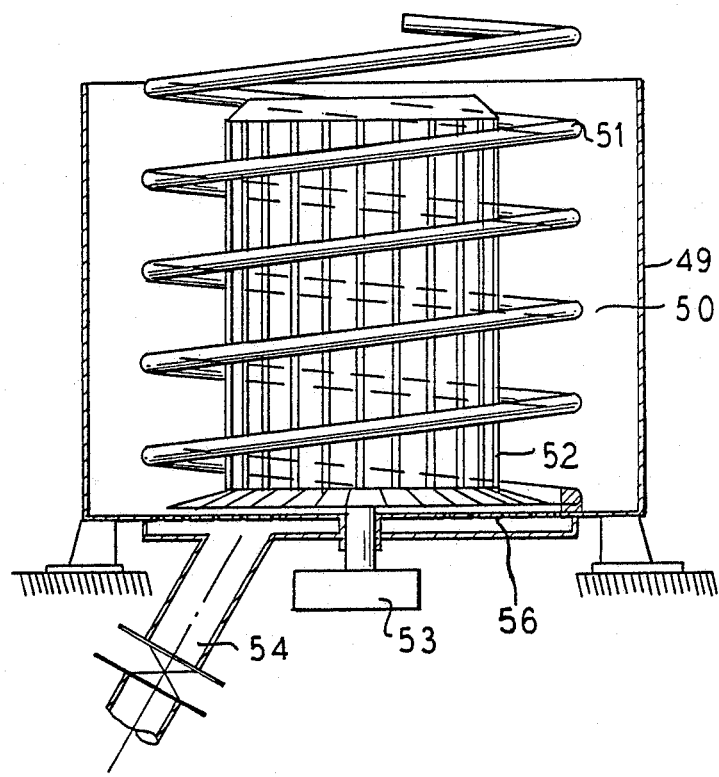
FIG. 6 is a vertical sectional view taken through a wastepaper recovery vat illustrating a further form of the invention.
Figure 7:
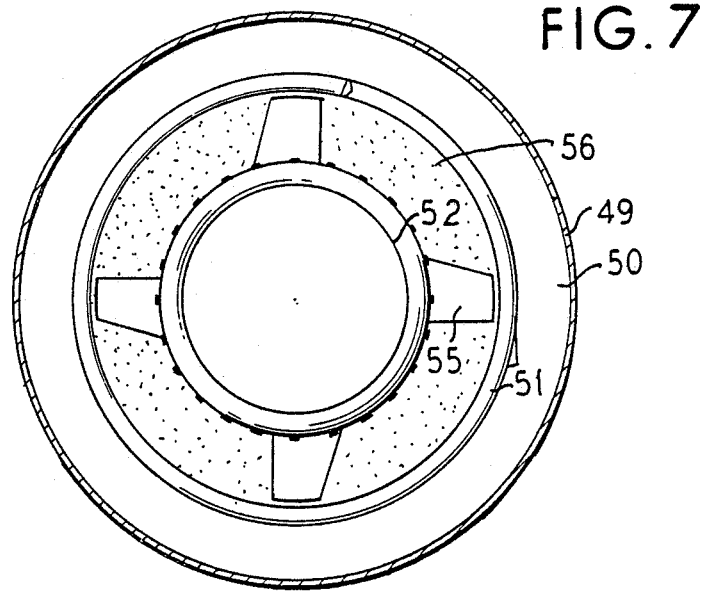
FIG. 7 is a plan view of the structure of FIG. 6.

In the arrangement of FIG. 6, a stationary coil is used and the liquid is forced relatively along the surface of the coil by impelling means which causes a relative rotational movement between the stock and helical rod coils to cause the stringy contaminants to climb the rods. In FIG. 6, vat 49 is provided with a chamber 50 therein and wastepaper and water are mixed within the chamber 50 and the pulp formed is removed through a conduit 54 at the bottom of the vat 49. A spherical stationary coil 51 is mounted within the chamber 50 and a rotor with friction bars 52 is driven in rotation within the coil by a suitable drive motor 53. The rotor is coaxial with the coil and is cylindrical in shape with a plurality of vertical bars 52 or other means to increase the drag or friction between the rotor and the high consistency stock. The long, slender contaminants will be caught by the helically shaped rod. The direction of rotation is in the direction in which the helical coils spiral upwardly so that the movement of the pulp reacting against the helical rods will cause an upward movement of the stringy contaminants. The contaminants are removed at the top of the coil as processing continues. As illustrated in FIG. 7, if desired, defibrating rotor blades 55 may be positioned at the bottom of the rotor, interacting with a bottom discharge screen as in a conventional pulper.

Thus, it will be seen that I have provided a simplified structure and method for the removal of stringy contaminants from wastepaper stock. The arrangement makes it possible to remove such contaminants with high consistency stock and to continue such removal in a continuous process with effectiveness not possible with arrangements heretofore available.

I claim:

1. An apparatus for removing stringy contaminants from a pulp in a wastepaper recovery system, comprising in combination:
   a vessel defining a chamber for containing wastepaper blended with water to form a liquid waste stock;
   an elongate helical rod located in the chamber to be submerged beneath the stock, and having an end disposed externally of said chamber, said rod formed in a helix about a central axis with the helix having a diameter measured laterally of the axis;
   means causing a relative rotational movement between the stock and the helical rod so that long slender contaminants will be captured and climb the rod for collection and removal from the stock; and said rod end disposed externally of said chamber being structured for removal of said captured contaminants from said chamber.

2. An apparatus for removing stringy contaminants from a pulp in a wastepaper recovery system constructed in accordance with claim 1:
   wherein said means is a driven rotor submerged in the stock and having rotational movement substantially about the axis of the helical rod.

3. An apparatus for removing stringy contaminants from a pulp in a wastepaper recovery system constructed in accordance with claim 1:
   wherein said means is in the form of a rotor coaxial with the helical rod and positioned within the rod.

4. An apparatus for removing stringy contaminants from a pulp in a wastepaper recovery system constructed in accordance with claim 1:
   wherein said vessel is cylindrical with the helical rod disposed coaxial therein and said means causing relative rotational movement is positioned coaxially within the rod.

5. An apparatus for removing stringy contaminants from a pulp in a wastepaper recovery system constructed in accordance with claim 1:
   wherein the central axis of the helical rod is inclined so as to be at an angle relative to a vertical plane.

6. An apparatus for removing stringy contaminants from a pulp in a wastepaper recovery system, comprising in combination:
   a vessel defining having a chamber for containing wastepaper blended with water to form a waste stock;

a first elongate helical rod extending into the chamber to be submerged beneath the stock, and having an end disposed externally of said chamber, said rod formed in a helix about a central axis with the helix having a diameter measured laterally of the axis;

a second elongate helical rod extending into the chamber to be submerged beneath the stock, and having and end disposed externally of said chamber, said rod formed in a helix about a central axis with the helix having a diameter measured laterally of the axis;

means causing relative rotational movement between the stock and said first and second helical rods so that long slender contaminants will be captured and climb the rods for collection and removal from the stock; and said ends disposed externally of said chamber of said first and second rods being structured for removal of said captured contaminants from said chamber.

7. An apparatus for removing stringy contaminants from a pulp in a wastepaper recovery system constructed in accordance with claim 6:

wherein said helical rods are interengaged and their axes are closer together than the diameter of each.

8. An apparatus for removing stringy contaminants from a pulp in a wastepaper recovery system constructed in accordance with claim 6:

including means for driving each of said helical rods in rotation about their axis.

9. An apparatus for removing stringy contaminants from a pulp in a wastepaper recovery system constructed in accordance with claim 6:

wherein the axes of said first and second rods are separated.

10. An apparatus for removing stringy contaminants from a pulp in a wastepaper recovery system constructed in accordance with claim 6:

wherein said helical rods are coaxial.

11. An apparatus for removing stringy contaminants from a pulp in a wastepaper recovery system constructed in accordance with claim 6:

including means for driving said first and second helical rods in opposite rotational directions.

12. An apparatus for removing stringy contaminants from a pulp in a wastepaper recovery system constructed in accordance with claim 6:

wherein said first and second rods are positioned so their axes are vertical.

13. An apparatus for removing stringy contaminants from a pulp in a wastepaper recovery system constructed in accordance with claim 6:

wherein said first and second rods are positioned so that their axes are at an incline with a vertical plane.

14. The method for removing stringy contaminants from a pulp in a wastepaper recovery system, comprising the steps:

providing a pulping vat having a chamber in which wastepaper is blended with water to form a liquid waste stock;

positioning an elongate helical rod in the chamber to be submerged beneath the stock, said rod formed in a helix about a central axis; with the helix having a diameter measured laterally of the axis;

generating a relative rotational movement between the stock and the helical rod whereby long slender stringy contaminants are captured and climb the rod for collection and removal from the stock; and removing said captured contaminants from said stock.

15. The method for removing stringy contaminants from a pulp in a wastepaper recovery system in accordance with the steps of claim 14:

including the step of driving the helical rod in rotation within the chamber.

16. The method for removing stringy contaminants from a pulp in a wastepaper recovery system in accordance with the steps of claim 14:

wherein the positioning and generating steps comprise positioning a plurality of elongate helical rods within the chamber and generating a relative rotational movement between the stock and said rods.

17. The method for removing stringy contaminants from a pulp in a wastepaper recovery system in accordance with the steps of claim 14:

wherein the positioning step comprises positioning a plurality of elongate helical rods coaxial relative to each other 18. The method for removing stringy contaminants from a pulp in a wastepaper recovery system in accordance with the steps of claim 17:

and driving said rods in rotation in opposite directions.

19. The method for removing stringy contaminants from a pulp in a wastepaper recovery system in accordance with the steps of claim 14:

wherein the positioning step comprises positioning a plurality of elongate helical rods in the chamber in interengaged relationship so that their helix axes are spaced apart less than the diameter of the helix of said rods; and driving said rods in rotation.

* * * * *